(12) United States Patent
Sornin et al.

(10) Patent No.: US 12,366,667 B2
(45) Date of Patent: Jul. 22, 2025

(54) GLOBAL NAVIGATION SATELLITE SYSTEM RECEIVER

(71) Applicant: Semtech Corporation, Camarillo, CA (US)

(72) Inventors: Nicolas Sornin, La Tronche (FR); Baozhu Ning, Grenoble (FR)

(73) Assignee: Semtech Corporation, Camarillo, CA (US)

( * ) Notice: Subject to any disclaimer, the term of this patent is extended or adjusted under 35 U.S.C. 154(b) by 485 days.

(21) Appl. No.: 17/972,203

(22) Filed: Oct. 24, 2022

(65) Prior Publication Data

US 2023/0131074 A1    Apr. 27, 2023

(30) Foreign Application Priority Data

Oct. 27, 2021 (EP) .................................. 21205060

(51) Int. Cl.
*G01S 19/42* (2010.01)
*G01S 19/14* (2010.01)

(52) U.S. Cl.
CPC .............. *G01S 19/42* (2013.01); *G01S 19/14* (2013.01)

(58) Field of Classification Search
CPC ........ G01S 19/09; G01S 19/34; G01S 19/254; G01S 19/256; G01S 19/258; G01S 19/29;
(Continued)

(56) References Cited

U.S. PATENT DOCUMENTS

| 2001/0017599 A1* | 8/2001 | Yule | G01S 5/0018 342/357.74 |
| 2002/0145557 A1* | 10/2002 | Roy | G01S 19/09 342/357.29 |

(Continued)

FOREIGN PATENT DOCUMENTS

| EP | 2267920 A2 | 12/2010 |
| WO | WO-2013/016800 A1 | 2/2013 |

OTHER PUBLICATIONS

Korea Intellectual Property Rights Information Service (KIPRIS), Notice of Preliminary Rejection issued in corresponding Korean Application No. 10-2022-0138932, mailed Aug. 28, 2024, 7 pages.

*Primary Examiner* — Olumide Ajibade Akonai
(74) *Attorney, Agent, or Firm* — BLANK ROME LLP (57) ABSTRACT

The invention relates to a Global Navigation Satellite System (GNSS) receiver, comprising 1) a radiofrequency (RF) front-end configured to acquire GNSS signals emitted by a plurality of GNSS satellites in at least two snapshot time windows, wherein each emitted GNSS signal comprises a respective known spreading code identifying the emitting GNSS satellite, and wherein the RF front-end is configured to transform the acquired GNSS signals in each of the at least two snapshot time windows into a digital sequence, respectively, and 2) a receiver unit configured to determine for each snapshot time window pseudo-ranges from the GNSS receiver to at least a subset of the emitting GNSS satellites, respectively, wherein said at least two subsets corresponding to the at least two snapshot time windows may differ from one another, and wherein said pseudo-ranges are determined using (i) the known spreading codes and (ii) the at least two digital sequences. The GNSS receiver is configured to determine composite pseudo-ranges between the GNSS receiver and a composite subset of the emitting GNSS satellites at composite receive times, (Continued)

using at least the determined pseudo-ranges corresponding to the at least two snapshot time windows. The invention also relates to an assembly comprising a GNSS receiver, a gateway and a computing unit. The invention also relates to a method for determining a position of a GNSS receiver.

14 Claims, 3 Drawing Sheets

(58) Field of Classification Search
CPC ........ G01S 19/05; G01S 19/30; G01S 19/252; G01S 19/42; G01S 19/40; G01S 19/06
See application file for complete search history.

(56) References Cited

U.S. PATENT DOCUMENTS

| | | | |
|---|---|---|---|
| 2012/0022779 A1* | 1/2012 | Lee | G01S 19/21 |
| | | | 701/408 |
| 2013/0328720 A1* | 12/2013 | Marshall | G01S 19/14 |
| | | | 342/357.76 |
| 2014/0152496 A1* | 6/2014 | Cho | G01S 19/13 |
| | | | 342/357.43 |
| 2015/0036724 A1 | 2/2015 | Van Dierendonck et al. | |
| 2016/0161614 A1* | 6/2016 | Lukcin | G01S 19/426 |
| | | | 342/357.27 |
| 2017/0322303 A1 | 11/2017 | Reynolds et al. | |
| 2020/0174138 A1 | 6/2020 | Kanda et al. | |

* cited by examiner

GLOBAL NAVIGATION SATELLITE SYSTEM RECEIVER

RELATED APPLICATION

This application claims priority to European Application No. EP21205060.3, filed on Oct. 27, 2021. The entire contents of this application is hereby incorporated by reference.

FIELD OF THE INVENTION

The present invention relates to a Global Navigation Satellite System (GNSS) receiver, an assembly, and a method for determining a position of the GNSS receiver.

BACKGROUND TO THE INVENTION

GNSS is an important part of modern technical infrastructure. GNSS, typically embodied as GPS, GALILEO, BeiDou, or GLONASS, is used for position determination purposes and for timing applications, e.g., in base stations of mobile phone networks.

GNSS receivers may be used in low power wide area networks (LPWAN), e.g., in a LoRaWAN network. In such a network, the GNSS receiver mainly sends uplinks to a gateway and has limited downlink capacity. Many Internet-of-Things (IoT) applications can in general profit from being equipped with GNSS functionality, e.g., IoT location applications. For the GNSS receiver to be able to determine its position, the GNSS receiver needs to be able to access ephemeris information on GNSS satellites: the GNSS receiver needs to either receive such ephemeris information from the low power wide area network or needs to demodulate it directly from acquired GNSS signals. Due to the limited downlink capacity, acquiring ephemeris information from the network is in general not feasible, and directly demodulating ephemeris information from acquired GNSS signals consumes a lot of power. Furthermore, due to loss in accuracy over time, ephemeris information needs to be sufficiently often refreshed, e.g., after every three hours.

In many IoT applications with GNSS functionality, it is essential that the GNSS receiver can operate for several years without needing a change of battery powering the GNSS receiver. In state-of-the-art solutions, the GNSS receiver in LPWAN therefore does not compute its position but only sends pseudo-ranges and optionally Doppler information to a cloud which then computes the position of the GNSS receiver. To do this, the cloud may host a GNSS solver and have access to ephemeris information. In such state-of-the-art solutions, the GNSS receiver only consumes energy during GNSS signal acquisition and data transmission to the cloud. Snapshot processing is another GNSS technique known from the prior art which helps optimize battery life. In snapshot processing, the GNSS receiver only scans several to hundreds of milliseconds of GNSS signals to extract pseudo-ranges and Doppler information. The scan time of a GNSS receiver operating as a snapshot receiver is mainly determined by available memory and a power budget of the GNSS receiver. Classical GNSS receivers on the other hand need to continuously capture several to several tens of seconds of GNSS signals.

Snapshot processing is known to be power efficient; due to short GNSS signal acquisition times in snapshot processing, however, snapshot processing may provide lower accuracy and sensitivity compared to classical GNSS reception techniques. Snapshot processing known from the prior art furthermore has difficulty dealing with outliers from single scans, and the LPWAN network cannot provide through the downlink enough information to the GNSS receiver to compensate above-mentioned disadvantages.

It is an object of the present invention to mitigate at least some of the disadvantages associated with GNSS receivers known in the prior art; it is in particular an object of the present invention to mitigate at least some disadvantages associated with GNSS receivers used in a LPWAN.

SUMMARY OF THE INVENTION

According to a first aspect of the present invention there is provided a GNSS receiver, involving the features recited in claim 1. Further optional features and embodiment of the GNSS receiver of the present invention are described in the dependent patent claims.

The invention relates to a Global Navigation Satellite System (GNSS) receiver, comprising 1) a radiofrequency (RF) front-end configured to acquire GNSS signals emitted by a plurality of GNSS satellites in at least two snapshot time windows, wherein each emitted GNSS signal comprises a respective known spreading code identifying the emitting GNSS satellite, and wherein the RF front-end is configured to transform the acquired GNSS signals in each of the at least two snapshot time windows into a digital sequence, respectively, and 2) a receiver unit configured to determine for each snapshot time window pseudo-ranges from the GNSS receiver to at least a subset of the emitting GNSS satellites, respectively, wherein said at least two subsets corresponding to the at least two snapshot time windows may differ from one another, and wherein said pseudo-ranges are determined using (i) the known spreading codes and (ii) the at least two digital sequences. The GNSS receiver is configured to determine composite pseudo-ranges between the GNSS receiver and a composite subset of the emitting GNSS satellites at composite receive times, using at least the determined pseudo-ranges corresponding to the at least two snapshot time windows.

Important GNSS systems are GPS, GALILEO, BeiDou or GLONASS. The inventive GNSS receiver may be deployed in a low power wide area network (LPWAN). The inventive GNSS receiver may carry out multi-constellation pseudo-range determination, i.e., it may determine pseudo-ranges to GNSS satellites from different constellations, e.g., GPS and BeiDou, simultaneously (or intermittently). The inventive GNSS receiver scans incoming GNSS signals in the snapshot time windows. The inventive GNSS receiver differs from GNSS receivers known in the prior art in that composite pseudo-ranges are determined as a replacement for pseudo-ranges. The inventive GNSS receiver may typically comprise an oscillator, for example a quartz-based oscillator, wherein said oscillator may be used by the receiver unit for determining pseudo-ranges.

The GNSS receiver may transmit the composite pseudo-ranges which are determined at composite receive times to a gateway, and a position of the GNSS receiver may be determined in a computing unit connected to the gateway, wherein said computing unit may comprise a GNSS solver. In this case, the GNSS receiver may only send the composite pseudo-ranges instead of the original pseudo-ranges to the gateway. The GNSS receiver may also determine a position of itself locally, e.g., using its own computing resources. In this case, the composite pseudo-ranges may not need to be sent to the gateway. In case that only composite pseudo-ranges are sent to the gateway, the GNSS solver may compute a position of the GNSS receiver with unknown time. In any case, the composite receive times may or may not be explicitly known to the GNSS receiver. Since not all emitted GNSS signals may arrive with sufficiently high quality at the GNSS receiver, the GNSS receiver may determine pseudo-ranges to only a subset of GNSS satellites.

Determining composite pseudo-ranges may lead to an improved precision. Composite pseudo-ranges constructed from N independent pseudo-range measurements, for example, N corresponding to the number of snapshot time windows, typically have a smaller standard deviation than pseudo-ranges obtained based on GNSS signals acquired in one snapshot time window. In an ideal scenario in which only thermal noise would be present as an error source (i.e., in case multi-path, ionosphere, troposphere, satellite clock errors, etc. would not be present or would already be compensated), the standard deviation of measurement error of composite pseudo-ranges would only be 1/sqrt(N) of the standard deviation of measurement error of pseudo-ranges determined based on individual snapshot time windows.

Transmitting composite pseudo-ranges instead of pseudo-ranges to the gateway may furthermore improve power consumption in the GNSS receiver. Transmission power is often comparable or even higher than power required for acquiring GNSS signals in LPWAN. Since the inventive GNSS receiver may transmit only composite pseudo-ranges and may not transmit pseudo-ranges corresponding to single snapshot time windows, the overall amount of data which is transmitted to the gateway may be minimized, leading to a reduction of sending power needed by the GNSS receiver and thereby, e.g., to an improved battery life of a battery powering the GNSS receiver deployed in LPWAN.

GNSS satellites move at finite velocities through space. The true range between an n-th GNSS satellite to a GNSS receiver at different points in time $t_1$ and $t_k$ can be (approximately—disregarding higher-order terms) modelled as follows:

$$x_{n,k} = x_{n,1} + V_{n,k} * (t_k - t_1) + \frac{1}{2} A_{n,k} * (t_k - t_1)^2$$

$V_{n,k}$ is the relative velocity between the n-th GNSS satellite at time $t_k$ with respect to the GNSS receiver, and $A_{n,k}$ is the corresponding acceleration. The relative velocity can be determined using Doppler measurement:

$$D_{n,k} = -\frac{V_{n,k}}{c} * Fc$$

c is the speed of light, Fc is a carrier frequency of a GNSS signal, e.g., 1575.42 MHz for the L1 channel of GPS, and $D_{n,k}$ corresponds to the Doppler frequency between the n-th GNSS satellite and the GNSS receiver at snapshot receive time $t_k$.

In an embodiment of the GNSS receiver according to the invention, the GNSS receiver comprises a communication transceiver for sending and receiving data to respectively from a gateway via a wireless channel, and the GNSS receiver is configured to transmit the composite pseudo-ranges via the communication transceiver to the gateway.

In a further embodiment of the GNSS receiver according to the invention, the GNSS receiver comprises a receiver local clock and a respective snapshot receive time, measured with the receiver local clock, in each of the at least two snapshot time windows, wherein the receiver unit is configured to determine pseudo-ranges at the at least two snapshot receive times, and wherein the GNSS receiver is configured to determine the composite receive times based on the at least two snapshot receive times. The receiver local clock may be embodied as a phased-lock loop clock, for example, and the receiver local clock may be based on a quartz-based oscillator which a GNSS receiver typically comprises.

In a further embodiment of the GNSS receiver according to the invention, the GNSS receiver is configured to additionally transmit the composite receive times via the communication transceiver to the gateway. The composite pseudo-ranges and the composite receive times can be transmitted together in a single uplink to the gateway. Transmitting both composite pseudo-ranges and composite receive times may therefore not require two separate uplinks.

In addition to composite pseudo-ranges, the GNSS receiver may therefore also transmit the composite receive times to the gateway. Composite receive times may be determined by the GNSS receiver based on the at least two snapshot receive times, for example by averaging in case the at least two snapshot receive times are sufficiently close to each other in time. A remote GNSS solver may in this case compute a position of the GNSS receiver with known time, wherein the known time may correspond to the composite receive times.

In a further embodiment of the GNSS receiver according to the invention, the at least two subsets comprise common subset elements, the common subset elements being common GNSS satellites in the plurality of GNSS satellites whose emitted respective GNSS signals are observable by the GNSS receiver in the at least two snapshot time windows, wherein the composite subset of the emitting GNSS satellites comprises said common subset elements, and wherein the GNSS receiver is configured to determine the composite pseudo-ranges by averaging corresponding pseudo-ranges, wherein correspondence is established across the at least two snapshot time windows among pseudo-ranges between (i) the GNSS receiver and (ii) the common GNSS satellites. The composite receive times may comprise one composite receive time, also termed average composite receive time, embodied as average between the at least two snapshot receive times in case the at least two snapshot receive times are sufficiently close in time.

A GNSS signal arriving at the GNSS receiver may be considered to be observable if the arriving GNSS signal has sufficient power so that it can be reliably detected by the GNSS receiver: this may require the arriving GNSS signal to for example have a sufficiently high signal-to-noise ratio. If, for example, a GNSS receiver acquires GNSS signals from six GNSS satellites at three snapshot receive times $t_1$, $t_2$, and $t_3$, determined pseudo-ranges may be described using the following linear model:

$$\begin{bmatrix} r_{1,1} & r_{1,2} & r_{1,3} \\ r_{2,1} & r_{2,2} & r_{2,3} \\ r_{3,1} & r_{3,2} & r_{3,3} \\ r_{4,1} & r_{4,2} & r_{4,3} \\ r_{5,1} & r_{5,2} & r_{5,3} \\ r_{6,1} & r_{6,2} & r_{6,3} \end{bmatrix} = \begin{bmatrix} x_{1,1} & x_{1,2} & x_{1,3} \\ x_{2,1} & x_{2,2} & x_{2,3} \\ x_{3,1} & x_{3,2} & x_{3,3} \\ x_{4,1} & x_{4,2} & x_{4,3} \\ x_{5,1} & x_{5,2} & x_{5,3} \\ x_{6,1} & x_{6,2} & x_{6,3} \end{bmatrix} + \begin{bmatrix} c_1 & c_2 & c_3 \\ c_1 & c_2 & c_3 \\ c_1 & c_2 & c_3 \\ c_1 & c_2 & c_3 \\ c_1 & c_2 & c_3 \\ c_1 & c_2 & c_3 \end{bmatrix} + \begin{bmatrix} w_{1,1} & w_{1,2} & w_{1,3} \\ w_{2,1} & w_{2,2} & w_{2,3} \\ w_{3,1} & w_{3,2} & w_{3,3} \\ w_{4,1} & w_{4,2} & w_{4,3} \\ w_{5,1} & w_{5,2} & w_{5,3} \\ w_{6,1} & w_{6,2} & w_{6,3} \end{bmatrix}$$

$r_{n,k}$ is the determined pseudo-range to an n-th GNSS satellite at a k-th snapshot receive time, $x_{n,k}$ is the true range to the n-th GNSS satellite at the k-th snapshot receive time, $c_k$ is a common offset of the six GNSS satellites at the k-th snapshot receive time, and $w_{n,k}$ is thermal noise often modelled as Gaussian random noise. The common offset in particular models a clock bias of the receiver local clock which is part of the GNSS receiver.

In this example, the composite pseudo-ranges may be determined as follows by averaging:

$$R_n = \frac{1}{3}\sum_{k=1}^{3} r_{n,k}$$

and the composite receive time may be computed using a similar averaging operation as:

$$T = \frac{1}{3}\sum_{k=1}^{3} t_k$$

Such linear averaging may be used if the three snapshot receive times are not too far from one another, i.e., in case all three measurements are done in a short time interval: in that case GNSS satellite trajectory may be assumed to be approximately linear. Six composite pseudo-ranges $R_1$ to $R_6$ are therefore determined at one composite receive time T. The inventive GNSS receiver may send these six composite pseudo-ranges to the gateway instead of the original 18 pseudo-ranges. The inventive GNSS receiver may also send the composite receive time T to the gateway instead of the original three snapshot receive times. After averaging, all six composite pseudo-ranges may have a same common offset. A GNSS solver may determine a position of the GNSS receiver based on the six composite pseudo-ranges with unknown time, or a GNSS solver may determine a position of the GNSS receiver based on the six composite pseudo-ranges with known time, the known time being the composite receive time, for example obtained by averaging.

In a further embodiment of the GNSS receiver according to the invention, the GNSS receiver is configured to subtract the determined pseudo-ranges corresponding to a reference GNSS satellite in the plurality of GNSS satellites from the determined pseudo-ranges corresponding to remaining GNSS satellites in the plurality of GNSS satellites, and wherein the GNSS receiver is configured to select the reference GNSS satellite based on received signal strengths in the at least two snapshot time windows, wherein the subtractions are carried out between pseudo-ranges corresponding to same snapshot receive windows and provide differential pseudo-ranges with respect to the reference GNSS satellite, and wherein the GNSS receiver is configured to determine the composite pseudo-ranges, the composite pseudo-ranges being embodied as differential composite pseudo-ranges, by averaging corresponding differential pseudo-ranges, wherein correspondence between differential pseudo-ranges is established across the at least two snapshot time windows, and wherein the GNSS receiver is configured to determine the composite receive time, the composite receive time being a differential composite receive time, for each differential composite pseudo-range, respectively. The GNSS receiver may determine the differential composite receive times by averaging over the snapshot receive times corresponding to the differential pseudo-ranges in case snapshot receive times are used as part of the differential composite pseudo-range determination. Averaging may be sufficient in case the snapshot receive times used for determining the differential composite receive times are sufficiently close in time. A GNSS solver may determine a position of the GNSS receiver based on the differential composite pseudo-ranges with unknown time, or a GNSS solver may determine a position of the GNSS receiver based on the differential composite pseudo-ranges at the differential composite receive times in case the GNSS solver has access to the differential composite receive times.

If, for example, a GNSS receiver acquires GNSS signals from six GNSS satellites at three snapshot receive times $t_1$, $t_2$, and $t_3$, and some GNSS signals are weak and therefore cannot be faithfully acquired, determined pseudo-ranges may be described using the following linear model:

$$\begin{bmatrix} r_{1,1} & r_{1,2} & r_{1,3} \\ r_{2,1} & r_{2,2} & r_{2,3} \\ r_{3,1} & r_{3,2} & r_{3,3} \\ r_{4,1} & r_{4,2} & r_{4,3} \\ '0' & r_{5,2} & r_{5,3} \\ r_{6,1} & '0' & r_{6,3} \end{bmatrix} = \begin{bmatrix} x_{1,1} & x_{1,2} & x_{1,3} \\ x_{2,1} & x_{2,2} & x_{2,3} \\ x_{3,1} & x_{3,2} & x_{3,3} \\ x_{4,1} & x_{4,2} & x_{4,3} \\ '0' & x_{5,2} & x_{5,3} \\ x_{6,1} & '0' & x_{6,3} \end{bmatrix} + \begin{bmatrix} c_1 & c_2 & c_3 \\ c_1 & c_2 & c_3 \\ c_1 & c_2 & c_3 \\ c_1 & c_2 & c_3 \\ '0' & c_2 & c_3 \\ c_1 & '0' & c_3 \end{bmatrix} + \begin{bmatrix} w_{1,1} & w_{1,2} & w_{1,3} \\ w_{2,1} & w_{2,2} & w_{2,3} \\ w_{3,1} & w_{3,2} & w_{3,3} \\ w_{4,1} & w_{4,2} & w_{4,3} \\ '0' & w_{5,2} & w_{5,3} \\ w_{6,1} & '0' & w_{6,3} \end{bmatrix}$$

Each '0' in the previous equation indicates that the corresponding pseudo-range, e.g., the pseudo-range to the fifth GNSS satellite at the time $t_1$, has not been determined. Without loss of generality, in the following it is assumed that the first GNSS satellite provides the strongest signals with a highest received signal strength. Subtracting the pseudo-ranges to the first GNSS satellite from the remaining pseudo-ranges results in:

$$\begin{bmatrix} 0 & 0 & 0 \\ \Delta r_{2,1} & \Delta r_{2,2} & \Delta r_{2,3} \\ \Delta r_{3,1} & \Delta r_{3,2} & \Delta r_{3,3} \\ \Delta r_{4,1} & \Delta r_{4,2} & \Delta r_{4,3} \\ '0' & \Delta r_{5,2} & \Delta r_{5,3} \\ \Delta r_{6,1} & '0' & \Delta r_{6,3} \end{bmatrix} = \begin{bmatrix} 0 & 0 & 0 \\ \Delta x_{2,1} & \Delta x_{2,2} & \Delta x_{2,3} \\ \Delta x_{3,1} & \Delta x_{3,2} & \Delta x_{3,3} \\ \Delta x_{4,1} & \Delta x_{4,2} & \Delta x_{4,3} \\ '0' & \Delta x_{5,2} & \Delta x_{5,3} \\ \Delta x_{6,1} & '0' & \Delta x_{6,3} \end{bmatrix} + \begin{bmatrix} 0 & 0 & 0 \\ \Delta w_{2,1} & \Delta w_{2,2} & \Delta w_{2,3} \\ \Delta w_{3,1} & \Delta w_{3,2} & \Delta w_{3,3} \\ \Delta w_{4,1} & \Delta w_{4,2} & \Delta w_{4,3} \\ '0' & \Delta w_{5,2} & \Delta w_{5,3} \\ \Delta w_{6,1} & '0' & \Delta w_{6,3} \end{bmatrix}$$

$\Delta r_{n,k} = r_{n,k} - r_{1,k}$ is a differential pseudo-range of the n-th GNSS satellite to the first GNSS satellite at the k-th snapshot receive time, $\Delta x_{n,k} = x_{n,k} - x_{1,k}$ is a differential true range of the n-th GNSS satellite to the first GNSS satellite at the k-th snapshot receive time, and $\Delta w_{n,k} = w_{n,k} - w_{1,k}$ is the differential of the noise term. The subtraction has removed common offsets.

Averaging provides differential composite pseudo-ranges, i.e., $\Delta R_2 = (\Delta r_{2,1} + \Delta r_{2,2} + \Delta r_{2,3})/3$, $\Delta R_3 = (\Delta r_{3,1} + \Delta r_{3,2} + \Delta r_{3,3})/3$, $\Delta R_4 = (\Delta r_{4,1} \ \Delta r_{4,2} \ \Delta r_{4,3})/3$, $\Delta R_5 = (\Delta r_{5,2} \ \Delta r_{5,3})/2$, and $\Delta R_6 = (\Delta r_{6,1} + \Delta r_{6,3})/2$.

$\Delta R_2$, $\Delta R_3$, $\Delta R_4$ correspond in this example to composite (differential) receive time $T = (t_1 + t_2 + t_3)/3$, $\Delta R_5$ corresponds to composite (differential) receive time $T_5 = (t_2 + t_3)/2$, and $\Delta R_6$ corresponds to composite (differential) receive time $T_6 = (t_1 + t_3)/2$. Such linear averaging may be used if the three snapshot receive times are not too far from one another: in that case GNSS satellite trajectory may be assumed to be approximately linear. In this example, the GNSS receiver may transmit the five determined differential composite pseudo-ranges and, optionally, the three composite (differential) receive times to the gateway.

In a further embodiment of the GNSS receiver according to the invention, the receiver unit is configured to determine Doppler frequencies between the GNSS receiver and the subset of the emitting GNSS satellites corresponding to the at least two snapshot time windows, respectively.

Doppler shifts occur due to relative movement between a sender, in this case a GNSS satellite, and a receiver, in this case the GNSS receiver, during the emitting of the GNSS signal by the GNSS satellite. In GPS, for example, Doppler frequencies are typically in the range of ±4.2 KHz. While determining pseudo-ranges, the GNSS receiver may determine such Doppler shifts as well. Doppler frequencies may be determined by the GNSS receiver to improve accuracy of determined pseudo-ranges: determined Doppler frequencies may be used to shift frequency of the receiver local clock to align replica GNSS signals created by the GNSS receiver with GNSS signals arriving at the GNSS receiver from a GNSS satellite.

In a further embodiment of the GNSS receiver according to the invention, the GNSS receiver is configured to determine Doppler frequencies between the GNSS receiver and the subset of the emitting GNSS satellites corresponding to the at least two snapshot time windows based on Almanac information received from at least one of the plurality of GNSS satellites.

Doppler frequencies may be determined based on Almanac information alone, or Doppler frequencies may be determined based on both Almanac information and Doppler frequencies estimated during the determining of pseudo-ranges using signal processing methods. Doppler frequencies may also be determined using only such signal processing methods.

In a further embodiment of the GNSS receiver according to the invention, the GNSS receiver is configured to determine time-aligned differential composite pseudo-ranges at a common composite receive time, wherein the GNSS receiver is configured to subtract Doppler frequencies corresponding to the reference GNSS satellite from the determined Doppler frequencies corresponding to the remaining GNSS satellites, the subtraction providing differential Doppler frequencies, and wherein the GNSS receiver is configured to determine the time-aligned differential composite pseudo-ranges based on (i) the determined differential composite pseudo-ranges, (ii) the differential Doppler frequencies, (iii) the differential composite receive times, and (iv) the common composite receive time.

In the previous example above regarding differential composite pseudo-ranges, differential composite pseudo-ranges were determined at three different composite (differential) receive times. To determine differential composite pseudo-ranges at a common composite receive time, determined Doppler frequencies may be used. In case snapshot receive times $t_1$, $t_2$, and $t_3$ are sufficiently close in time, the Doppler frequency corresponding to each GNSS satellite/GNSS receiver pair may be assumed to be constant over the three snapshot receive times, i.e., there are six Doppler frequencies $D_1$, $D_2$, $D_3$, $D_4$, $D_5$, and $D_6$ in this example. As above, the first Doppler frequency $D_1$ may be subtracted from the remaining Doppler frequencies, providing differential Doppler frequencies between the reference GNSS satellite (the first GNSS satellite in this example) and remaining GNSS satellites: $\Delta D_2$, $\Delta D_3$, $\Delta D_4$, $\Delta D_5$, and $\Delta D_5$. The differential composite pseudo-range for GNSS satellites five and six may then be projected to composite receive time T (which, in this example, is the composite receive time for GNSS signals emitted by GNSS satellites two to four):

$$\Delta R'_5 = \Delta R_5 - \Delta D_5 * \frac{c}{Fc}(T_5 - T), \text{ and } \Delta R'_6 = \Delta R_6 - \Delta D_6 * \frac{c}{Fc}(T_6 - T).$$

In this example it is assumed that the snapshot receive times are sufficiently close to one another so that GNSS satellite trajectories may be modelled as linear. The time-aligned differential composite pseudo-ranges may, however, also be determined in case GNSS satellite trajectories between the snapshot receive times can no longer be linearly modelled: in this case, the projection mechanism described in this example can be modified to include differential acceleration. Using the projection mechanism described in this example, differential composite pseudo-ranges may be projected to a freely chosen common composite receive time. Having a common composite receive time reduces the amount of data which the GNSS receiver may send to the gateway, thereby improving, e.g., battery life of a battery powering the GNSS receiver: instead of three composite receive times as in the first part of this example in which Doppler frequencies were not used, only one time, the common composite receive times, may need to be sent by the GNSS receiver to the gateway. The GNSS receiver may, however, also only send the differential composite pseudo-ranges to the gateway.

In a further embodiment of the GNSS receiver according to the invention, the GNSS receiver is configured to determine the composite pseudo-ranges based on a system of linear equations, the system of linear equations mapping a composite vector comprising unknown composite pseudo-ranges and unknown offsets to a target vector, wherein the target vector comprises an entry for each determined pseudo-range, each pseudo-range being determined at its respective snapshot receive time, wherein each entry of the target vector is based on (i) the respective determined pseudo-range, (ii) a respective velocity between the GNSS receiver and the GNSS satellite corresponding to the respective determined pseudo-range at the respective snapshot receive time, (iii) the respective snapshot receive time, and (iv) a common composite receive time, wherein the composite receive times are embodied as the common composite receive time, and wherein the respective velocity between the GNSS receiver and the GNSS satellite is determined based on the determined corresponding Doppler frequency.

In a further embodiment of the GNSS receiver according to the invention, each entry of the target vector is additionally based on a respective acceleration between the GNSS receiver and the GNSS satellite corresponding to the respective determined pseudo-range at the respective snapshot receive time, wherein the GNSS receiver is configured to determine the acceleration based on (i) a temporal numerical differentiation of the determined Doppler frequencies, and/or (ii) the Almanac information received by the GNSS receiver.

In the following, it is assumed that pseudo-ranges between the GNSS receiver and up to N GNSS satellites can be determined at K snapshot receive times. N composite pseudo-ranges may therefore be determined at a composite receive time t. The K common offsets corresponding to K snapshot receive times may also be unknown in general. The N composite pseudo-ranges to be determined have a new common offset: any of the K common offsets can therefore be treated as known or set to an arbitrary value, e.g., to a value of '0'. Supposing, for example, that the K-th common offset $c_K$ is set to '0', N+K−1 unknowns may need to be determined: $X=[R_1, R_2 \ldots, R_N, c_1, c_2 \ldots, c_{K-1}]^T$; this vector X may be termed composite vector.

A target vector Y can be constructed as follows: each determined pseudo-range $r_{n,k}$, together with the corresponding velocity $V_{n,k}$ and, if applicable, i.e. if $(t-t_k)$ is not sufficiently small for acceleration to be disregarded, the corresponding acceleration $A_{n,k}$, provides an entry to the target vector Y in the form of $$r_{n,k} - V_{n,k}*(t-t_k) - \frac{1}{2}A_{n,k}*(t-t_k)^2.$$

A matrix H can be constructed which (linearly) maps the composite vector X to the target vector Y: Y=H*X. If, for example, pseudo-ranges are determined to all N GNSS satellites at all of the K snapshot receive times, matrix H may be constructed as follows: in this case, H is a matrix of size (N*K)×(N+K−1); each line of H contains (N+K−1) zeros and one or two ones at the corresponding composite pseudo-ranges and common offset. The first row of H is, in this example, equal to [1, 0, 0, . . . , 0, 1, 0, . . . , 0], with the first element of the first row equal to 1 (corresponding to composite pseudo-range $R_1$ to the first GNSS satellite) and with the (N+1)-th element of the first row equal to 1 (corresponding to common offset $c_1$). The second row of H in this example is equal to [1, 0, 0, . . . , 0, 1, 0, . . . , 0], with the first element of the second row being equal to 1 (corresponding to composite pseudo-range $R_1$ to the first GNSS satellite) and with the (N+2)-th element of the second row being equal to 1 (corresponding to common offset $c_2$). The K-th row of H in this example is equal to [1, 0, . . . , 0, 0, 0, . . . , 0], with only the first element of the K-th row being equal to 1 (corresponding to composite pseudo-range $R_1$ to the first GNSS satellite); the K-th common offset may be set to 0.

Through matrix manipulation, in particular matrix inversion, the entries of composite vector X may be determined from target vector Y. Y and H may be constructed in such a way that all determined pseudo-ranges are taken account of. Pseudo-ranges which cannot be reliably determined, for example due to a weak GNSS signal arriving at the GNSS receiver, may be disregarded when constructing Y and H. Composite receive time t used for constructing target vector Y may be set arbitrarily, e.g., between $t_1$ to $t_K$. Setting t centrally between $t_1$ to $t_K$ may be beneficial to minimize error.

In a further embodiment of the GNSS receiver according to the invention, the GNSS receiver is configured to transmit the determined Doppler frequencies and/or determined differential Doppler frequencies via the communication transceiver to the gateway.

Doppler frequencies and/or differential Doppler frequencies may be used to compute a first rough estimate of the position of the GNSS receiver using Doppler positioning algorithms known in the state of the art. The Doppler frequencies and/or differential Doppler frequencies may be sent together with the composite pseudo-ranges, and optionally the composite receive times, in a single uplink to the gateway, or the Doppler frequencies and/or differential Doppler frequencies may be sent in a separate uplink to the gateway. The Doppler frequencies and/or differential Doppler frequencies may also be sent together with the composite receive times in a single uplink to the gateway.

In a further embodiment of the GNSS receiver according to the invention, the GNSS receiver is configured to carry out outlier detection on the determined pseudo-ranges before determining the composite pseudo-ranges, wherein outliers are detected using majority voting and/or are detected based on GNSS satellite trajectory models, wherein the GNSS receiver is configured to determine GNSS satellite trajectory models using the received Almanac information.

In a further embodiment of the GNSS receiver according to the invention, the receiver unit is embodied as an open-loop receiver unit, and wherein the open-loop receiver unit is configured to determine the pseudo-ranges using batch processing.

In a further embodiment of the GNSS receiver according to the invention, the receiver unit is configured to determine, for a first snapshot time window of the at least two snapshot time windows, the pseudo-ranges and Doppler frequencies corresponding to said first snapshot time window based on a search over a full search space, and the receiver unit is configured to determine, for a subsequent snapshot time window of the at least two snapshot time windows, the subsequent snapshot time window being subsequent to the first snapshot time window, the pseudo-ranges and Doppler frequencies corresponding to said subsequent snapshot time window based on a search over a restricted search space, the restricted search space being based on the pseudo-ranges and Doppler frequencies determined for the first snapshot time window.

In a further embodiment of the GNSS receiver according to the invention, the receiver unit is configured to determine, for a first snapshot time window of the at least two snapshot time windows, the pseudo-ranges and Doppler frequencies corresponding to said first snapshot time window based on a search over a first search space, and the receiver unit is configured to determine, for a subsequent snapshot time window of the at least two snapshot time windows, the subsequent snapshot time window being subsequent to the first snapshot time window, the pseudo-ranges and Doppler frequencies corresponding to said subsequent snapshot time window based on a search over a subsequent search space, the subsequent search space being based on the pseudo-ranges and Doppler frequencies determined for the first snapshot time window.

The first search space may be based on previously available knowledge which the GNSS receiver might possess. The GNSS receiver might, for example, possess a rough estimate of a relative velocity of a GNSS satellite with respect to itself, and therefore constrain search over possible Doppler shifts.

In a further embodiment of the GNSS receiver according to the invention, the GNSS receiver comprises at least one antenna for receiving GNSS signals emitted by GNSS satellites, and the GNSS receiver is configured to select the antenna from the at least one antenna for receiving GNSS signals with best reception quality. The GNSS receiver may also be configured to dynamically adapt (i) a number of snapshot time windows, (ii) capture time of each snapshot time window (from several to hundreds of ms), (iii) reception antenna, (iv) reception bandwidth, (v) reception sampling ration and (iv) interval between each snapshot time window, conditional on the signal reception condition, power budget, available memory size on the GNSS receiver etc.

According to a further aspect of the present invention there is provided an assembly, comprising 1) a GNSS receiver according to the invention, 2) a gateway, in particular embodied as low power wide area network (LPWAN) gateway, and 3) a computing unit connected to the gateway, wherein said computing unit is configured to determine a position of the GNSS receiver based on (i) composite pseudo-ranges provided by the GNSS receiver via the gateway to the computing unit, and (ii) navigation messages emitted by the plurality of GNSS satellites, wherein the navigation messages comprise information on ephemerides of the plurality of GNSS satellites, wherein the computing unit is configured to determine the position of the GNSS receiver using a GNSS solver.

The computing unit may also be in a cloud. The computing unit may therefore be directly connected to the gateway, or the computing unit may be indirectly connected to the gateway, in particular over a network. The computing unit may also receive composite receive times provided by the GNSS receiver, and use the received composite receive times to determine the position of the GNSS receiver at a known time. In case the computing unit received only composite pseudo-ranges, it may determine a position of the GNSS receiver with unknown time.

According to a further aspect of the present invention there is provided a method for determining a position of a GNSS receiver, comprising the following steps: 1) acquiring GNSS signals emitted by a plurality of GNSS satellites in at least two snapshot time windows, 2) determining pseudo-ranges from the GNSS receiver to the plurality of GNSS satellites in each of the at least two snapshot time windows based on the acquired GNSS signals, 3) determining composite pseudo-ranges related to (i) the GNSS receiver and (ii) at least a subset of the plurality of GNSS satellites, at composite receive times using the determined pseudo-ranges in the at least two snapshot time windows, and 4) determining the position of the GNSS receiver using (i) at least the composite pseudo-ranges, and (ii) information on the ephemerides of the GNSS satellites in at least the subset of the plurality of GNSS satellites. In case the GNSS receiver comprises a local receiver clock, the pseudo-ranges may be determined at the at least two snapshot receive times in the at least two snapshot time windows.

In an embodiment of the method according to the invention, the method comprises the step of transmitting the composite pseudo-ranges to a computing unit via a gateway. The position of the GNSS receiver may be determined on the computing unit. Composite receive times may also be determined and optionally sent to the computing unit. The computing unit may determine the position of the GNSS receiver using the composite pseudo-ranges at the composite receive times in case the composite receive times are sent via the gateway to the computing unit; alternatively, the position of the GNSS receiver is determined with an unknown time.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
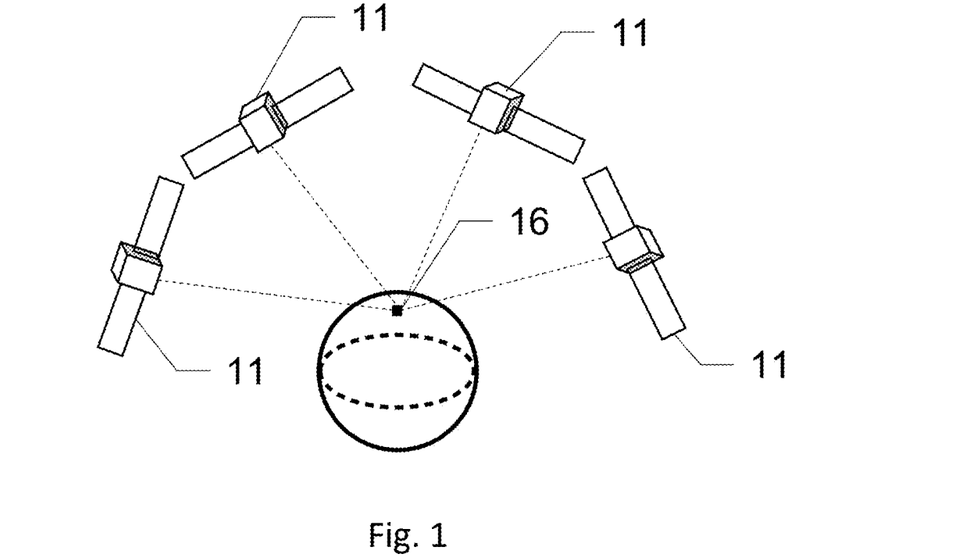
FIG. 1 shows a schematic depiction of a part of a GNSS system according to the state of the art.

FIG. 1 shows a schematic depiction of a part of a GNSS system according to the state of the art. FIG. 1 shows a GNSS receiver 16 on the surface of earth. GNSS satellites 11 orbit around earth and emit GNSS signals towards the earth surface. The GNSS receiver 16 detects and acquires such GNSS signals and uses them for determining its 3D position.

In the following, basic GNSS principles are explained by referring to the Global Positioning System (GPS). Similar principles apply to other GNSS system such as GALILEO, GLONASS or BeiDou. GPS comprises four segments: 1) a space segment, 2) a control segment, 3) a ground segment, and 4) a user segment. The space segment comprises the constellation of GPS satellites, the control segment monitors the operation of the space segment and provides the space segment with updating information, the ground segment is typically used for improving GPS availability, and the user segment comprises hardware and software for determining positions and/or velocities of GPS receivers or comprises hardware and software for timing applications.

The space segment of GPS comprises '31' operational satellites at the time of summer of 2021. The satellites are placed on orbits around earth in such a way that at any moment and at any place on earth at least four GPS satellites are in view. Each satellite broadcasts precise information on its orbit in the form of its ephemeris. Less precise information on the orbits of all GPS satellites is provided in the form of an almanac. Both the ephemeris and the almanac are transmitted as part of the navigation message by each GPS satellite.

GPS uses code-division multiple access for transmitting information over specified frequency bands. Typical frequency bands used by GPS are the L1 and L2 channels, the L1 channel being centered at 1575.42 MHz, and the L2 channel being centered at 1227.60 MHz. Each GPS satellite is equipped with a precise atomic clock having fundamental frequency of 10.23 MHz. The central frequency of the L1 channel is therefore equal to the fundamental frequency times '154', and the central frequency of the L2 channel is equal to the fundamental frequency times '120'. GPS uses Gold codes for enabling code-division multiple access, Gold codes being an example of spreading codes. Gold codes are pseudo-random noise sequences with a period of 1023. Since the fundamental frequency of each atomic clock on the GPS satellites is 10.23 MHz, each Gold code takes 1 ms for transmission. Gold codes are designed in such a way that an autocorrelation value of close to one is only achieved for small shifts between two identical Gold code sequences (for larger shifts, autocorrelation values are close to zero), and cross-correlation values between different Gold code sequences are always close to zero irrespective of shift.

Each GPS satellite transmits its navigation message at 50 bits per second (bps). Since to each GPS satellite a unique Gold code is assigned, the GPS satellite modulates its navigation message with its Gold code and further modulates it with a carrier frequency (e.g. the center frequency of the L1 channel). The navigation message is a 1500-bit sequence and takes 30 seconds to transmit. The resulting GPS signal is transmitted towards earth.

On earth, the GPS signal emitted by a GPS satellite 11 is acquired by an antenna connected to a GPS receiver 16. The antenna may also be part of the GPS receiver 16. GPS signal acquisition by the GPS receiver 16 is carried out using an autocorrelation technique: the GPS receiver 16 generates GPS replica signals and compares the GPS replica signals with the actually measured GNSS signal (before carrying out this comparison, the acquired GPS signal is first processed by a radiofrequency (RF) front-end of the GPS receiver); due to above-mentioned properties of Gold codes, this comparison can be performed with high precision and provides an estimate of the time passed between emission of the GPS signal by a GPS satellite and reception by the GPS receiver. The "time passed" is detected in form of a shift which maximizes above-mentioned autocorrelation. Multiplying the estimated "time passed" with the speed of light provides a pseudo-range between the GPS receiver and a GPS satellite. At any moment, GPS signals from a plurality of GPS satellites 11 arrive at the GPS receiver 11. Due to above-mentioned correlation properties of Gold sequences, the GPS receiver can process GPS signals emitted by different GPS satellites independently after the RF front-end (pseudo-ranges can therefore be independently determined to all GPS satellites 11 whose GPS signals are acquired by the GPS receiver 16).

Due to biases in the GPS satellite clocks driving the emission of GPS signals by the GPS satellites, biases in a clock of the GPS receiver and propagation errors (ionosphere and troposphere) as well as additional errors sources (multipath, thermal noise in the GPS receiver etc.), pseudo-ranges do not correspond to true ranges. In principle, if the pseudo-ranges would be equal to true ranges, three GPS satellites would be needed to determine three degrees of freedom of a GPS receiver (trilateration). Due to the presence of an offset between pseudo-range and true range, however, the offset needs to be determined as well. Four GPS satellites must therefore be visible to a GPS receiver so that the GPS receiver can determine both its own position as well as the offset using the received GPS signals from at least four GPS satellites.

Figure 2:
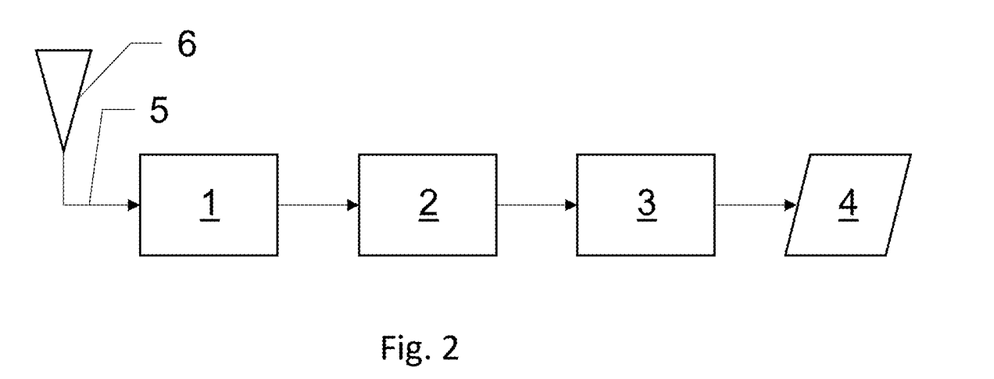
FIG. 2 shows a schematic depiction of state-of-the-art GNSS receiver processing steps for determining a position of a GNSS receiver.

FIG. 2 shows a schematic depiction of state-of-the-art GNSS receiver processing steps for determining a position of a GNSS receiver. The shown state-of-the art GNSS receiver uses snapshot processing (open-loop receiver architecture). Incoming GNSS signals which are emitted by GNSS satellites are recorded by an antenna 6. The recorded GNSS signals 5 are passed to a RF front-end 1. GNSS signals are typically not transmitted at baseband by the GNSS satellites. Additionally, the GNSS satellites use digital modulation. GPS satellites, for example, may use binary phase-shift keying (BPSK) as digital modulation scheme. The RF front-end 1 may therefore transform the incoming GNSS signals into a digital sequence, either directly to baseband or to an intermediate frequency. The RF front-end 1 typically comprises bandpass filters, analog-to-digital converters and quantizers. The digital sequence provided by the RF front-end 1 may then be processed by an open-loop receiver architecture 2.

Due to movement between GNSS satellites and a GNSS receiver (such relative movement is typically mostly caused by the high speed of GNSS satellites in space), Doppler shifts occur in the GNSS signals. The RF front-end 1 may be configured to acquire GNSS signals in snapshot time windows. The open-loop receiver architecture 2 may determine pseudo-ranges by carrying out many correlations in parallel. The GNSS replica signals used for the correlations may be varied over a three-dimensional space comprising possible GNSS satellites, possible Doppler shifts and possible code delays of the spreading code. If the GNSS satellite is known, e.g., by exploiting Almanac information, the three-dimensional search space may be reduced to a two-dimensional search space over possible Doppler shifts and possible code delays.

The open-loop receiver architecture 2 therefore provides for each snapshot time window pseudo-ranges between the GNSS receiver and the GNSS satellites whose signals are acquired in the respective snapshot time windows. Each set of pseudo-ranges is subsequently provided to a navigation module 3 which may comprise a well-known GNSS solver. The navigation module 3 may provide a 3D position and/or a velocity of the GNSS receiver as output 4 for each set of provided pseudo-ranges.

Figure 3:
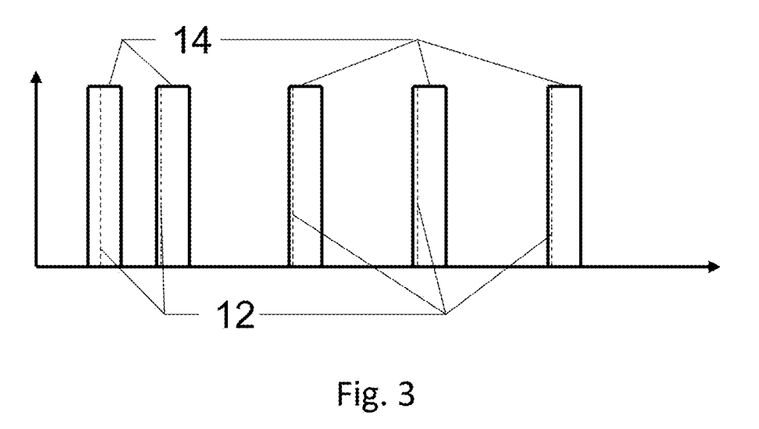
FIG. 3 shows a schematic depiction of snapshot time windows and snapshot receive times in the snapshot time windows.

FIG. 3 shows a schematic depiction of snapshot time windows 14 and snapshot receive times 12 in the snapshot time windows 14. Snapshot time windows 14 may be equidistantly spaced in time (not shown), or snapshot time windows 14 may be irregularly spaced in time as shown in FIG. 3. Each snapshot time window may have different temporal extents, or the temporal extent of all snapshot time windows may be the same, e.g., 50 ms. In a snapshot time window, the GNSS receiver is configured to acquire GNSS signals emitted by GNSS satellites. For each snapshot time window 14, pseudo-ranges may be determined with respect to the snapshot receive times 12 in the snapshot time windows 14. The snapshot receive times 12 may temporally be placed differently in different snapshot time windows, or the snapshot receive times 12 may temporally be all placed at a same relative location in the respective snapshot time windows. The snapshot receive times 12 may typically be set by the GNSS receiver. In a conventional GNSS receiver, for example, snapshot receive times 12 may be equidistantly spaced in time, e.g., every 60 seconds. Snapshot receive times 12 may be measured using a receiver local clock which may be part of the GNSS receiver. Since the receiver local clock is typically biased, the snapshot receive times 12 measured using the receiver local clock typically do not correspond to true receive times. Such timing errors are subsequently discussed in greater detail with respect to the embodiment of FIG. 4.

Pseudo-ranges may be determined at snapshot receive times 12 in a plurality of snapshot time windows 14. Such pseudo-ranges may be compressed into composite pseudo-ranges at composite receive times, wherein said composite receive times may be derived based on the snapshot receive times 12.

Figure 4:
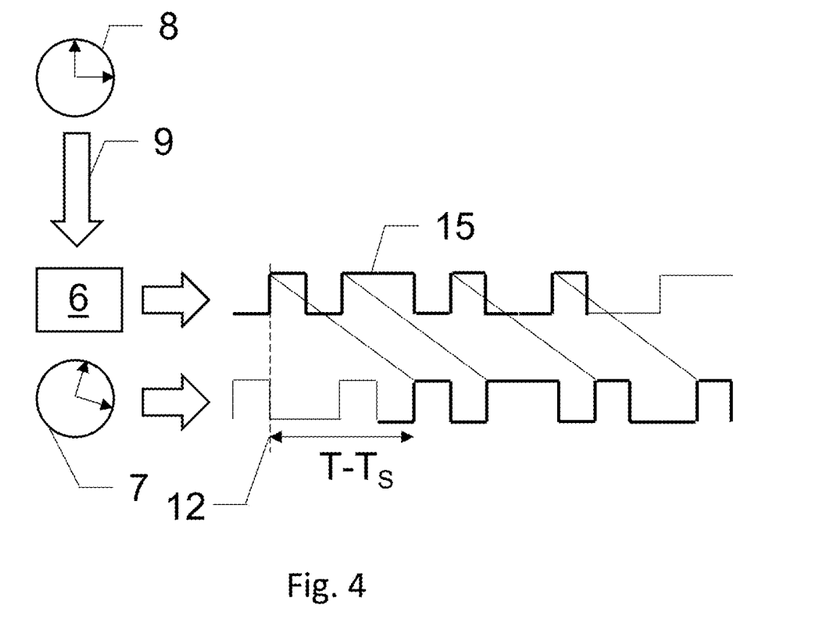
FIG. 4 shows a schematic depiction of different times involved in a determination of pseudo-ranges according to the state of the art.

FIG. 4 shows a schematic depiction of different times involved in a determination of pseudo-ranges according to the state of the art. In FIG. 4, only errors due to clock biases are considered, while propagation errors and other error sources such as multipath errors or relativistic errors are neglected for the sake of simplicity. The emission of GNSS signals by a GNSS satellite is driven by a satellite clock 8 which satellite clock 8 has a specific bias. The bias of a satellite clock 8 is typically sent to a GNSS receiver as part of the navigation message. The GNSS signal is transmitted via radio waves 9 to an antenna 6 of the GNSS receiver. The RF front-end converts said GNSS signal to a digital sequence 15. For the sake of simplicity, the situation depicted in FIG. 4 corresponds to a single snapshot time window and only one GNSS signal emitted by one GNSS satellite arriving at the antenna 6.

A GNSS receiver may comprise a receiver local clock 7 with a bias which is typically much larger than the bias of the satellite clock 8. The receiver local clock 7 may be used for generating GNSS replica signals. GNSS replica signals may also be generated using an oscillator, e.g., a quartz-based oscillator, wherein said oscillator may be part of the GNSS receiver. In FIG. 4, the snapshot receive time 12, measured by the receiver local clock 7, is at a time T. $T_S$ corresponds to a reading of the satellite clock 8 when the GNSS signal is emitted. The difference $T-T_S$ can be determined using the autocorrelation technique. Since the snapshot receive time T can be considered to correspond to a true receive time t plus a receiver local clock 7 bias $\tau$, and $T_S$ can be seen as an addition of a true satellite emission time $t_S$ and a satellite clock 8 bias $\tau_S$, the pseudo-range is given as $P(t)=r(t,t_S)+c(\tau-\tau_S)$, where $r(t,t_S)$ is the true range from the GNSS receiver (at true receive time) to the satellite (at the true satellite emission time). The true satellite emission time $t_S$ can be determined using an iterative algorithm known as "light time equation", for example. It is therefore primarily the receiver local clock 7 bias which may be determined by solving the GNSS navigation equations.

Figure 5:
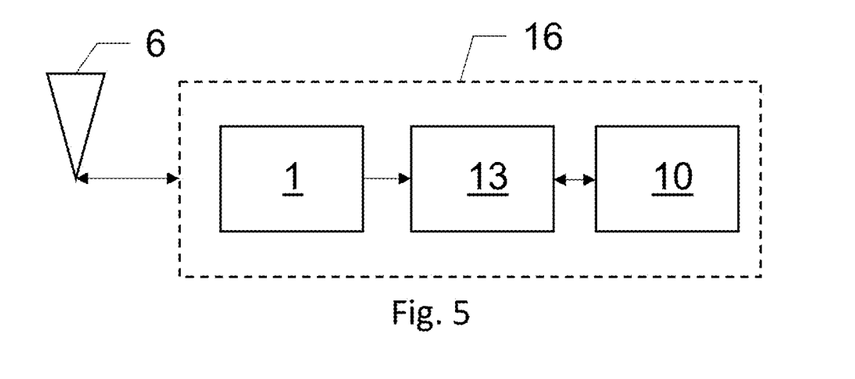
FIG. 5 shows a schematic depiction of an embodiment of a GNSS receiver according to the invention.

FIG. 5 shows a schematic depiction of an embodiment of a GNSS receiver 16 according to the invention. The GNSS receiver 16 receives GNSS signals from an antenna 6. The antenna 6 may also be part of the GNSS receiver 16. The GNSS receiver comprises an RF front-end 1, a microprocessor 13 and a communication transceiver 10 having access to the antenna 6. The microprocessor may be used for implementing snapshot processing 2 in software. The microprocessor 13 may also determine composite pseudo-ranges and composite receive times based on pseudo-ranges determined at snapshot receive times obtained using snapshot processing 2. The microprocessor 13 may also be shared with other functionalities. If the GNSS receiver 16 is, for example, part of a mobile phone, the microprocessor 13 may be a regular microprocessor already included in the mobile phone.

Figure 6:
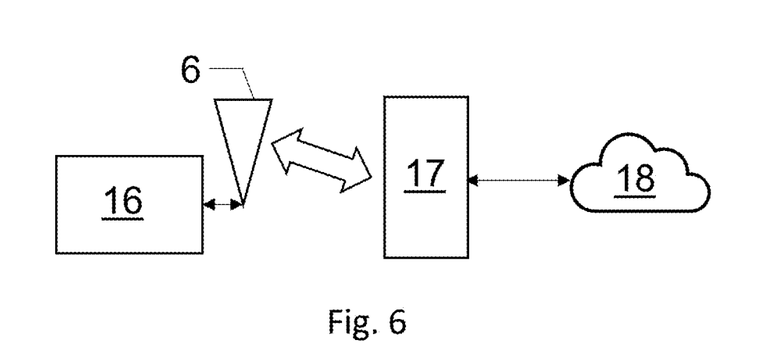
FIG. 6 shows a schematic depiction of an assembly according to the invention comprising a GNSS receiver, a gateway and a computing unit.

FIG. 6 shows a schematic depiction of an assembly 6, 16, 17, 18 according to the invention comprising a GNSS receiver 16, a gateway 17, and a computing unit 18. An antenna 6 for receiving GNSS signals may be part of the GNSS receiver 16, or the antenna 6 may be separate. The GNSS receiver may transmit composite pseudo-ranges and optionally composite receive times to the computing unit 18 via the gateway 17. The GNSS receiver may be used in a low power wide area network (LPWAN). A GNSS solver on the computing unit 18 may then determine a position and/or velocity of the GNSS receiver from the composite pseudo-ranges at either an unknown time (in case composite receive times are not transmitted) or at a known time in case composite receive times are transmitted, wherein the GNSS solver uses additional information obtained from GNSS navigation messages, for example.

The invention claimed is:

1. Global Navigation Satellite System (GNSS) receiver, comprising
 a radiofrequency front-end configured to acquire GNSS signals emitted by a plurality of GNSS satellites in at least two snapshot time windows, wherein each emitted GNSS signal comprises a respective known spreading code identifying the emitting GNSS satellite, and wherein the RF front-end is configured to transform the acquired GNSS signals in each of the at least two snapshot time windows into a digital sequence, respectively, and
 a receiver unit configured to determine for each snapshot time window pseudo-ranges from the GNSS receiver to at least a subset of the emitting GNSS satellites, respectively, wherein said at least two subsets corresponding to the at least two snapshot time windows may differ from one another, and wherein said pseudo-ranges are determined using (i) the known spreading codes and (ii) the at least two digital sequences,
wherein
the GNSS receiver is configured to determine composite pseudo-ranges between the GNSS receiver and a composite subset of the emitting GNSS satellites at composite receive times, using at least the determined pseudo-ranges corresponding to the at least two snapshot time windows.

2. GNSS receiver according to claim 1, wherein the GNSS receiver comprises a communication transceiver for sending and receiving data to respectively from a gateway via a wireless channel, and wherein the GNSS receiver is configured to transmit the composite pseudo-ranges via the communication transceiver to the gateway.

3. GNSS receiver according to claim 1, wherein the GNSS receiver comprises a receiver local clock and a respective snapshot receive time, measured with the receiver local clock, in each of the at least two snapshot time windows, wherein the receiver unit is configured to determine pseudo-ranges at the at least two snapshot receive times, and wherein the GNSS receiver is configured to determine the composite receive times based on the at least two snapshot receive times.

4. GNSS receiver according to claim 3, wherein the GNSS receiver is configured to additionally transmit the composite receive times via the communication transceiver to the gateway.

5. GNSS receiver according to claim 1, wherein the at least two subsets comprise common subset elements, the common subset elements being common GNSS satellites in the plurality of GNSS satellites whose emitted respective GNSS signals are observable by the GNSS receiver in the at least two snapshot time windows, wherein the composite subset of the emitting GNSS satellites comprises said common subset elements, and wherein the GNSS receiver is configured to determine the composite pseudo-ranges by averaging corresponding pseudo-ranges, wherein correspondence is established across the at least two snapshot time windows among pseudo-ranges between (i) the GNSS receiver (16) and (ii) the common GNSS satellites.

6. GNSS receiver according to claim 1, wherein the GNSS receiver is configured to subtract the determined pseudo-ranges corresponding to a reference GNSS satellite in the plurality of GNSS satellites from the determined pseudo-ranges corresponding to remaining GNSS satellites in the plurality of GNSS satellites, wherein the GNSS receiver is configured to select the reference GNSS satellite based on received signal strengths in the at least two snapshot time windows, wherein the subtractions are carried out between pseudo-ranges corresponding to same snapshot receive windows and provide differential pseudo-ranges with respect to the reference GNSS satellite, and wherein the GNSS receiver is configured to determine the composite pseudo-ranges, the composite pseudo-ranges being embodied as differential composite pseudo-ranges, by averaging corresponding differential pseudo-ranges, wherein correspondence between differential pseudo-ranges is established across the at least two snapshot time windows, and wherein the GNSS receiver is configured to determine the composite receive time, the composite receive time being a differential composite receive time, for each differential composite pseudo-range, respectively.

7. GNSS receiver according to claim 1, wherein the receiver unit is configured to determine Doppler frequencies between the GNSS receiver and the subset of the emitting GNSS satellites corresponding to the at least two snapshot time windows, respectively, and/or wherein the GNSS receiver is configured to determine Doppler frequencies between the GNSS receiver and the subset of the emitting GNSS satellites corresponding to the at least two snapshot time windows based on Almanac information received from at least one of the plurality of GNSS satellites.

8. GNSS receiver according to claim 5, wherein the GNSS receiver is configured to determine time-aligned differential composite pseudo-ranges at a common composite receive time, wherein the GNSS receiver is configured to subtract Doppler frequencies corresponding to the reference GNSS satellite from the determined Doppler frequencies corresponding to the remaining GNSS satellites, the subtraction providing differential Doppler frequencies, and wherein the GNSS receiver is configured to determine the time-aligned differential composite pseudo-ranges based on (i) the determined differential composite pseudo-ranges, (ii) the differential Doppler frequencies, (iii) the differential composite receive times, and (iv) the common composite receive time.

9. GNSS receiver according to claim 3, wherein the GNSS receiver is configured to determine the composite pseudo-ranges based on a system of linear equations, the system of linear equations mapping a composite vector comprising unknown composite pseudo-ranges and unknown offsets to a target vector, wherein the target vector comprises an entry for each determined pseudo-range, each pseudo-range being determined at its respective snapshot receive time, wherein each entry of the target vector is based on (i) the respective determined pseudo-range, (ii) a respective velocity between the GNSS receiver and the GNSS satellite corresponding to the respective determined pseudo-range at the respective snapshot receive time, (iii) the respective snapshot receive time, and (iv) a common composite receive time, wherein the composite receive times are embodied as the common composite receive time, and wherein the respective velocity between the GNSS receiver and the GNSS satellite is determined based on the determined corresponding Doppler frequency.

10. GNSS receiver according to claim 9, wherein each entry of the target vector is additionally based on a respective acceleration between the GNSS receiver and the GNSS satellite corresponding to the respective determined pseudo-range at the respective snapshot receive time, wherein the GNSS receiver is configured to determine the acceleration based on (i) a temporal numerical differentiation of the determined Doppler frequencies, and/or (ii) the Almanac information received by the GNSS receiver.

11. GNSS receiver according to claim 7, wherein the GNSS receiver is configured to transmit the determined Doppler frequencies and/or determined differential Doppler frequencies via the communication transceiver to the gateway.

12. GNSS receiver according to claim 1, wherein the GNSS receiver is configured to carry out outlier detection on the determined pseudo-ranges before determining the composite pseudo-ranges, wherein outliers are detected using majority voting and/or are detected based on GNSS satellite trajectory models, wherein the GNSS receiver is configured to determine GNSS satellite trajectory models using the received Almanac information.

13. GNSS receiver according to claim 1, wherein the receiver unit is configured to determine, for a first snapshot time window of the at least two snapshot time windows, the pseudo-ranges and Doppler frequencies corresponding to said first snapshot time window based on a search over a full search space or based on a search over a first search space, and wherein the receiver unit is configured to determine, for a subsequent snapshot time window of the at least two snapshot time windows, the subsequent snapshot time window being subsequent to the first snapshot time window, the pseudo-ranges and Doppler frequencies corresponding to said subsequent snapshot time window based on a search over a restricted search space, the restricted search space being based on the pseudo-ranges and Doppler frequencies determined for the first snapshot time window based on the search over the full search space or based on the search over the first search space.

14. Method for determining a position of a GNSS receiver, comprising the following steps: 1) acquiring GNSS signals emitted by a plurality of GNSS satellites in at least two snapshot time windows, 2) determining pseudo-ranges related to (i) the GNSS receiver and (ii) the plurality of GNSS satellites in each of the at least two snapshot time windows based on the acquired GNSS signals, 3) determining composite pseudo-ranges from the GNSS receiver to at least a subset of the plurality of GNSS satellites at composite receive times using the determined pseudo-ranges in the at least two snapshot time windows, and 4) determining the position of the GNSS receiver using (i) at least the composite pseudo-ranges, and (ii) information on the ephemerides of the GNSS satellites in at least the subset of the plurality of GNSS satellites.

* * * * *